(No Model.)
G. SOBOTKA & W. AHRENS.
APPARATUS FOR SEPARATING SOLID MATTER FROM LIQUIDS.
No. 488,956. Patented Dec. 27, 1892.
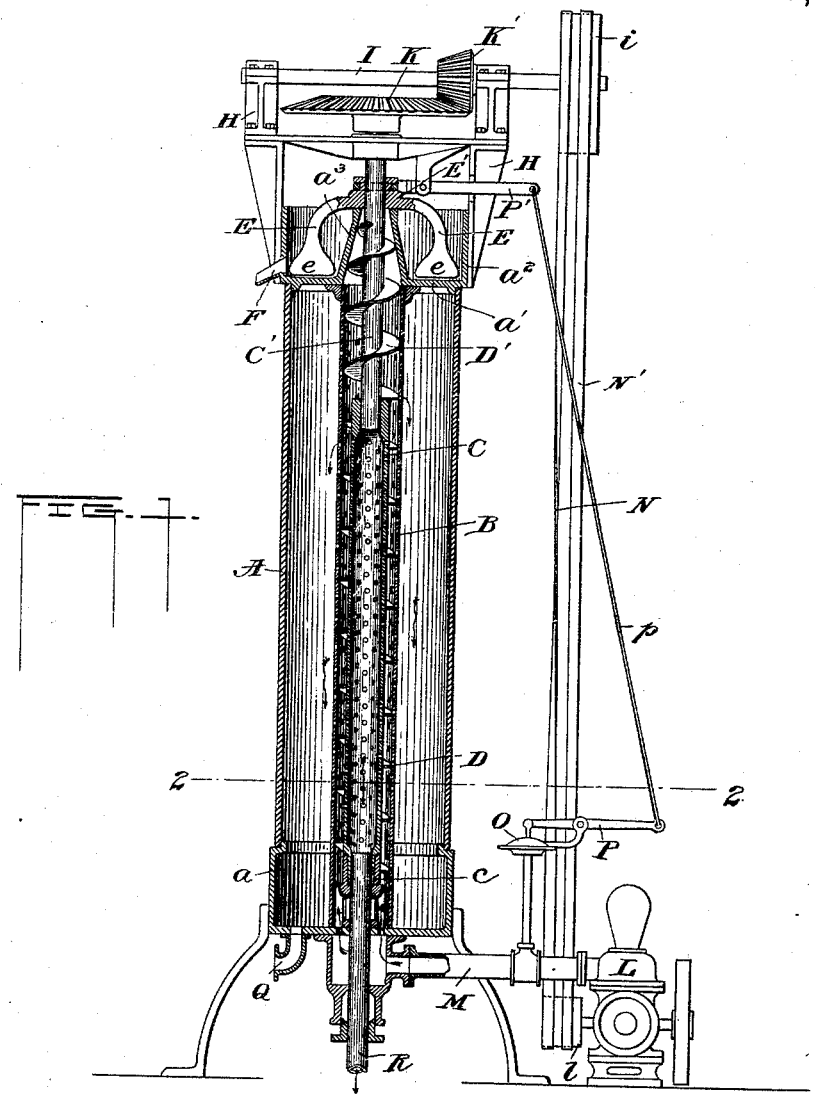
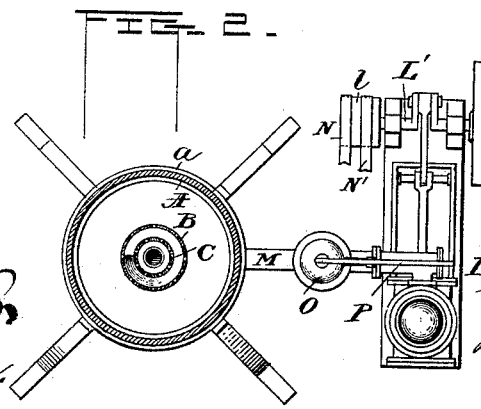
Witnesses
Inventors
Gustave Sobotka
W<sup>m</sup> Ahrens
By Butterworth and Dowell
their Attorneys

UNITED STATES PATENT OFFICE.

GUSTAVE SOBOTKA, OF NEW YORK, AND WILLIAM AHRENS, OF LONG ISLAND CITY, NEW YORK.

APPARATUS FOR SEPARATING SOLID MATTER FROM LIQUIDS.

SPECIFICATION forming part of Letters Patent No. 488,956, dated December 27, 1892.

Application filed August 16, 1892. Serial No. 443,256. (No model.)

*To all whom it may concern:*

Be it known that we, GUSTAVE SOBOTKA, a citizen of Austria-Hungary, residing at New York, in the county of New York, and WILLIAM AHRENS, a citizen of the United States, residing at Long Island City, in the county of Queens, State of New York, have invented certain new and useful Improvements in Apparatus for Separating Solid Matter from Liquids; and we do hereby declare the following to be a full, clear, and exact description of the invention, such as will enable others skilled in the art to which it appertains to make and use the same.

This invention relates to improvements in apparatus for separating solid matter from liquids.

The invention is an improvement upon the apparatus disclosed in a joint application filed in the United States Patent Office on January 6, 1892, Serial No. 417,198. In the aforesaid application we have described and shown an apparatus which is specially adapted for separating the solid particles or grain from the liquid matter composing the waste material or "slops" from distilleries, breweries, starch factories &c., resulting from the various processes of manufacturing malt liquors, which waste material is ordinarily discarded or thrown away as useless; the object being to reclaim such solid particles or grain and adapt the same to be used for cattle food or for other purposes.

One object of the present invention is to provide an efficient apparatus which will more readily and speedily effect the separation of the solid matter and which will be less liable to clog or break in use than the apparatus heretofore proposed.

Further objects are to provide means for automatically regulating the ingress and egress of the "slops" or liquid containing the grain to be separated, and to improve the construction and increase the efficiency of the apparatus.

With these and other objects in view the invention consists in certain improved features of construction and combinations of parts all as will be hereinafter described and particularly pointed out in the claims at the end of this specification.

In the accompanying drawings which form a part of this specification and in which similar letters of reference are used to denote similar parts of the apparatus, Figure 1, is a vertical sectional elevation of an apparatus embodying our invention; and Fig. 2, is a transverse section of the same taken on line 2—2 of Fig. 1.

Referring particularly to the drawings, A denotes an outer casing or cylinder which may be made of sheet metal, wood, or any suitable material and within which may be placed concentrically therewith a perforated filtering cylinder B; the latter being provided with small perforations throughout its length adapted to serve as a filter or strainer which may permit the liquid to flow therefrom into the space between the cylinders A and B but retain the solid particles of matter separated from the "slops."

C, denotes a hollow shaft which constitutes in effect a second filtering cylinder extending within the filtering cylinder B the greater part of the length thereof and arranged concentrically therewith; its upper end being made fast to or formed integrally with a solid extension C'. The lower end of the hollow shaft section C is fitted to revolve in a step-box or bearing $c$, supported within the casing A and its upper end is fitted to rotate in a suitable bearing mounted upon the framework at the top of the casing A, as shown.

The casing A is preferably though not necessarily cylindrical in form and may be constructed with a short bottom section and a longer section mounted thereon and provided with a head or cover $a'$, having an annular upwardly extending flange $a^2$ and a central upwardly extending hollow conical projection $a^3$, terminating about flush with the upper edge of the flange $a^2$, so as to form a receptacle for the solid particles of matter or grain exuding from the apex of the truncated cone $a^3$.

D, denotes a spiral blade which is fitted in the space between the interior of cylinder B and the exterior of cylinder C and may extend from the lower end of the hollow shaft or filtering cylinder to which it is attached to the upper end thereof at its junction with the solid section C', from which point a spiral section D', fixed to said solid section of the hollow shaft extends to the upper end of the truncated cone $a^3$; the upper portion of the spiral or screw being made tapering so as to correspond with the tapered opening through the cone. The spiral blade is preferably continuous from bottom to top of the rotary shaft, but may be made in sections and secured thereto in any proper manner. It is, however, adapted to fit snugly the annular space between the outer filtering cylinder and the inner rotary-shaft or filtering cylinder so as to prevent the solid matter from sinking after it has once entered the spiral way provided for its expulsion from the cylinder.

E, E, denote a pair of arms projecting from a hub E', which is fitted by spline and groove or other suitable connection upon the shaft section C', so as to rotate with the shaft but be free to move vertically thereon to a limited extent; said hub forming a sliding cover or relief valve for the upper end of the cone $a^3$. The arms E are provided or formed integrally with fan-shaped blades or paddles e, e, which are adapted to carry the solid matter falling into the receptacle a', to the discharge spout or chute F, which may empty into any suitable receptacle.

H, denotes the framing mounted upon the casing A so as to support the driving gear.

I denotes a shaft journaled in suitable bearings mounted upon the frame H and connected by bevel-gears K, K', with the solid section C' of the rotary filtering cylinder so that when said shaft I is rotated motion will be imparted to said cylinder.

L, denotes a pumping engine or force pump of any suitable construction which may connect by means of a pipe M, with the lower end or inlet to the filtering cylinder B.

N, N', denote suitable belts or bands connecting fixed and loose pulleys $i$, of the usual construction on the shaft I with corresponding pulleys $l$ on the fly-wheel shaft L' of the pump L; the belt N being crossed and idle except when it is desired to reverse the direction of rotation of the revolving filtering cylinder and spiral blade for the purpose of washing out or cleaning the apparatus.

O, denotes a pressure regulator which may be of any suitable construction. In the form shown it consists of a casing which communicates with the inlet pipe M and in which is inclosed a flexible sheet-brass or other suitable diaphragm which is connected to an oscillating lever P, the long arm of which connects by means of a rod $p$ with the long arm of a lever P' pivoted to an arm or lug depending from the cross-piece of the frame H, and having its short arm engaged with the hub E', so that the latter may be raised or lowered by the movements of the lever P' without interfering with the rotatory movement of the hub.

Q, denotes the discharge pipe connecting the space between the casing A, and filtering cylinder B, and R a similar pipe leading from the interior of the filtering cylinder C. These pipes may connect with any suitable vessel adapted to receive the liquid matter expressed from the slops.

The outer shell or casing A is not absolutely indispensable to the operation of the apparatus, except for the purpose of confining the liquid which exudes from the cylinder B, and conducting the same to the waste pipe Q, and the two concentric filtering cylinders would accomplish the separation without the inclosing casing, but we preferably use such casing. Similar results might also be accomplished by fixing the spiral or carrier on the interior of the outer filtering cylinder and causing the latter to revolve while the inner cylinder remains stationary. Other modifications will also readily suggest themselves to persons skilled in the art to which the invention relates and hence we do not desire to be limited to the exact construction and arrangement of parts shown and described.

The operation of the apparatus is as follows:—The "slops" or liquid matter commingled with grain to be separated may be forced by the pump L into the lower end of the filtering cylinder B, and is caused to ascend the same under pressure. At the same time the spiral blade D, D', is rotated so as to carry the solid particles of matter upward while the liquid matter escapes through the perforations in the cylinders B, C, and runs out through the pipes Q, R, to a suitable receptacle. The solid matter forced upward by the spiral blade or screw is expelled at the apex of the cone $a^3$ against the downward pressure exerted by the rotating hub E', and falls into the receptacle a'. It is then caught by the blades e, and carried to the exit pipe or spout F, from which it may be conducted to any suitable receptacle. The cone $a^3$ and tapering spiral fitting the same, together with the rotary sliding hub or cover serve to prevent too free an egress of the solid matter and also tend to squeeze the material at this point so as to expel any water remaining therein and permit the solid material to drop over into the space surrounding the cone and connecting with the discharge spout. When the pressure in the filtering cylinder is too great it will be relieved by the pressure regulator, which is adapted under any abnormal pressure upon the diaphragm to lift the hub or valve E' so as to increase the size of the exit opening at the apex of the cone $a^3$, and to reverse this operation when the pressure is diminished.

Having thus fully described our invention, what we claim as new and desire to secure by Letters Patent of the United States, is:—

1. An apparatus for separating solid matter from liquids, comprising a rotary filtering cylinder and a stationary filtering cylinder arranged the one within the other so as to provide an annular space between the two cylinders for the passage of the material to be filtered, a spiral carrier supported by said rotary cylinder within said annular space and closely fitting the same, inlet and outlet openings communicating with opposite extremities of said annular space, a sliding valve or cover for said outlet adapted to rotate with said rotary cylinder, gearing for imparting motion to said rotary cylinder and carrier, and means for opening or closing said valve accordingly as the pressure within the cylinder is increased or diminished, substantially as described.

2. In combination with the outer casing, the stationary filtering cylinder arranged concentrically therein, a second but shorter filtering cylinder arranged within said stationary cylinder, a spiral carrier extending from the inlet to the filtering cylinders within the annular space between the same to the upper end of the shorter cylinder and provided with an enlarged section fitting the upper end of the outer filtering cylinder and tapered toward its upper end, a cover for said casing having an annular upwardly extending circumferential flange and a central upwardly extending hollow conical projection fitting over the tapered end of said carrier, a sliding cover or valve arranged over said conical projection, and means for imparting motion to said rotary cylinder and carrier, substantially as described.

3. An apparatus for separating solid matter from liquids comprising the cylindrical casing, the perforated stationary cylinder fitted concentrically therein, the rotary shaft arranged within said stationary cylinder and provided with a hollow perforated section forming an inner filtering cylinder, a spiral carrier fixed to said hollow section within the annular space surrounding the same and connecting at its upper end with an enlarged section having a tapered upper end fitting a correspondingly tapered opening in the cover of the outer cylinder, a rotary sliding hub or valve arranged over said tapered opening and provided with laterally and downwardly curved arms or stirrers, an apparatus for forcing the material to be filtered into the annular space between the filtering cylinders, and a pressure regulator connecting with said rotary sliding valve, substantially as described.

4. In combination with the inclosing casing, the outer filtering cylinder, the concentrically arranged hollow filtering shaft having the spiral blade attached exteriorly thereto and adapted to rotate therewith; said blade having a tapered upper end, the combined cylinder head and receptacle having the centrally disposed hollow cone to receive the correspondingly tapered end of said spiral blade, the vertically sliding rotary hub adapted to cover the apex of said hollow cone, and a pressure regulator connecting with said hub, substantially as described.

In testimony whereof we affix our signatures in presence of two witnesses.

GUSTAVE SOBOTKA.
WILLIAM AHRENS.

Witnesses:
JACOB BENNINGER, Jr.,
ERNEST WEILE.